(12) United States Patent
Miao et al.

(10) Patent No.: US 11,039,496 B2
(45) Date of Patent: Jun. 15, 2021

(54) METHOD AND APPARATUS

(71) Applicant: Nokia Solutions and Networks Oy, Espoo (FI)

(72) Inventors: De Shan Miao, Beijing (CN); Timo Erkki Lunttila, Espoo (FI); Claudio Rosa, Randers (DK)

(73) Assignee: HMD Global Oy, Espoo (FI)

( * ) Notice: Subject to any disclaimer, the term of this patent is extended or adjusted under 35 U.S.C. 154(b) by 371 days.

(21) Appl. No.: 14/776,000

(22) PCT Filed: Mar. 14, 2013

(86) PCT No.: PCT/EP2013/055194
§ 371 (c)(1),
(2) Date: Sep. 14, 2015

(87) PCT Pub. No.: WO2014/139570
PCT Pub. Date: Sep. 18, 2014

(65) Prior Publication Data
US 2016/0295634 A1 Oct. 6, 2016

(51) Int. Cl.
*H04W 76/27* (2018.01)
*H04W 4/70* (2018.01)
(Continued)

(52) U.S. Cl.
CPC .............. *H04W 76/27* (2018.02); *H04L 5/005* (2013.01); *H04L 41/0681* (2013.01);
(Continued)

(58) Field of Classification Search
CPC ..... H04W 68/00; H04W 76/28; H04W 76/27; H04W 4/70; H04W 8/082; H04W 40/005;
(Continued)

(56) References Cited

U.S. PATENT DOCUMENTS

| 5,896,561 A * | 4/1999 | Schrader ............... H04L 1/0025 370/445 |
| 2002/0001299 A1* | 1/2002 | Petch .................... H04J 3/0682 370/350 |

(Continued)

FOREIGN PATENT DOCUMENTS

CN 102210190 A 10/2011

OTHER PUBLICATIONS

3GPP TSG-RAN WG1 #59, Jeju, Korea, Nov. 9-13, 2009, R1-095011, "Extended cell DTX for enhanced energy-efficient network operation", Ericsson, ST-Ericsson, 6 pgs.
(Continued)

*Primary Examiner* — Charles N Appiah
*Assistant Examiner* — Frank E Donado
(74) *Attorney, Agent, or Firm* — Harrington & Smith

(57) ABSTRACT

A method including determining whether an apparatus is to operate in a first, second or third mode of operation; wherein said first mode of operation includes a first level of activity, said second mode of operation includes a second level of activity that is lower than said first level of activity, and said third mode of operation includes a third level of activity that is lower than said second level of activity; applying a first reference signal transmission regime when in said second mode of operation; and applying a second reference signal transmission regime when in said third mode of operation.

18 Claims, 8 Drawing Sheets

(51) Int. Cl.
    *H04W 52/02*     (2009.01)
    *H04L 5/00*     (2006.01)
    *H04W 8/08*     (2009.01)
    *H04W 40/00*     (2009.01)
    *H04W 68/02*     (2009.01)
    *H04L 12/24*     (2006.01)
    *H04L 12/26*     (2006.01)
    *H04W 76/28*     (2018.01)
    *H04W 84/12*     (2009.01)
    *H04W 88/08*     (2009.01)

(52) U.S. Cl.
    CPC ............... *H04L 43/16* (2013.01); *H04W 4/70* (2018.02); *H04W 8/082* (2013.01); *H04W 40/005* (2013.01); *H04W 52/0235* (2013.01); *H04W 68/02* (2013.01); *H04W 76/28* (2018.02); *H04W 84/12* (2013.01); *H04W 88/08* (2013.01); *Y02D 30/70* (2020.08)

(58) Field of Classification Search
    CPC . H04W 52/0235; H04W 68/02; H04W 84/12; H04W 88/08; H04L 5/005; H04L 41/0681; H04L 43/16; Y02D 30/70
    USPC ......................................................... 455/458
    See application file for complete search history.

(56) References Cited

U.S. PATENT DOCUMENTS

| | | | |
|---|---|---|---|
| 2008/0039032 A1* | 2/2008 | Haumont | H04W 8/22 455/115.1 |
| 2008/0181127 A1 | 7/2008 | Terry et al. | 370/252 |
| 2011/0128865 A1* | 6/2011 | Doppler | H04W 52/0206 370/252 |
| 2011/0244792 A1 | 10/2011 | Park et al. | 455/39 |
| 2013/0258919 A1* | 10/2013 | Damnjanovic | H04W 52/0209 370/311 |
| 2014/0341140 A1* | 11/2014 | Beale | H04W 60/06 370/329 |

OTHER PUBLICATIONS

3GPP TSG-RAN WG1 #71, Nov. 12-16, 2012, New Orleans, LA, USA, R1-125118, "Design aspects of NCT", Qualcomm Inc., 3 pgs.

* cited by examiner

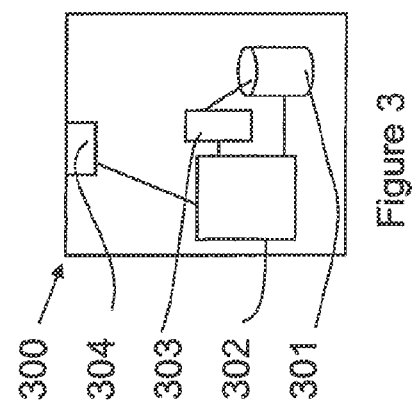
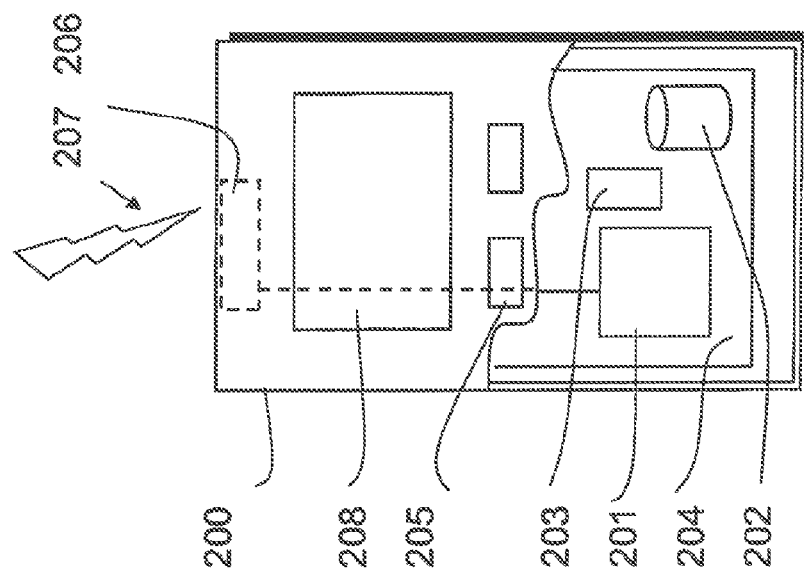

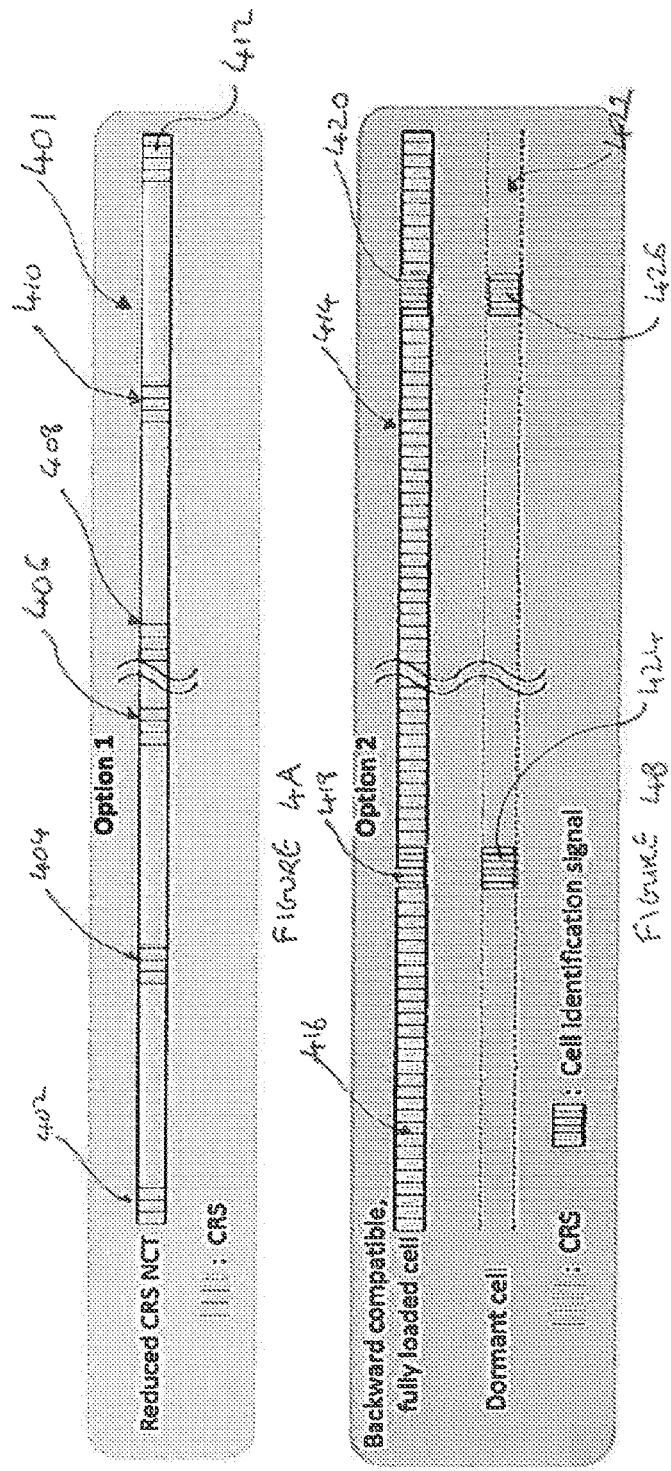

METHOD AND APPARATUS

This disclosure relates to methods and apparatus and in particular but not exclusively to methods and apparatus for use where a cell or node has multiple activity levels.

A communication system can be seen as a facility that enables communication sessions between two or more nodes such as fixed or mobile devices, machine-type terminals, access nodes such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how devices shall communicate, how various aspects of communications shall be implemented and how devices for use in the system shall be configured.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a device such as a user equipment is used for enabling receiving and transmission of communications such as speech and content data.

Communications can be carried on wireless carriers. Examples of wireless systems include public land mobile networks (PLMN) such as cellular networks, satellite based communication systems and different wireless local networks, for example wireless local area networks (WLAN). In wireless systems a communication device provides a transceiver station that can communicate with another communication device such as e.g. a base station of an access network and/or another user equipment. The two directions of communications between a base station and communication devices of users have been conventionally referred to as downlink and uplink. Downlink (DL) can be understood as the direction from the base station to the communication device and uplink (UL) the direction from the communication device to the base station.

In a first aspect there is provided a method comprising: determining whether an apparatus is to operate in a first, second or third mode of operation; wherein said first mode of operation comprises a first level of activity, said second mode of operation comprises a second level of activity that is lower than said first level of activity, and said third mode of operation comprises a third level of activity that is lower than said second level of activity; applying a first reference signal transmission regime when in said second mode of operation; and applying a second reference signal transmission regime when in said third mode of operation.

Preferably the method comprises moving from any one of said first, second and third modes of operation to any other of said first, second and third modes of operation.

Preferably the method comprises operating in said first mode of operation when a parameter satisfies a first threshold level, operating in said second mode of operation when said parameter satisfies a second threshold level that is lower than said first threshold level, and operating in said third mode of operation when said parameter satisfies a third threshold level that is lower than said second threshold level.

Preferably said parameter comprises at least one of: a cell-load, a neighbouring eNB requirement; paging information; user equipment triggering information.

Preferably said first reference signal transmission regime comprises transmitting at least one reference signal with a first time interval.

Preferably said second reference signal transmission regime comprises transmitting at least one reference signal with a second time interval that is longer than said first time interval.

Preferably said first mode of operation is associated with an active state of a base station, said second mode of operation is associated with a short dormancy state of a base station; and said third mode of operation is associated with a long dormancy state of a base station.

Alternatively said second reference signal transmission regime comprises not transmitting any reference signals.

Preferably said at least one reference signal comprises one of: a synchronization signal for a user equipment; a common reference signal; a discovery signal.

Preferably said determining whether an apparatus is to operate in said first, second or third mode of operation is dependent upon a network determination.

Alternatively said determining whether an apparatus is to operate in said first, second or third mode of operation is dependent upon user equipment triggering.

Preferably said method comprises one or both of transmitting and receiving data when in said first mode of operation only.

Preferably said method comprises de-activating a transmitter and/or receiver of said apparatus when operating in said second mode of operation or said third mode of operation.

Preferably said first mode of operation comprises applying a reference signal transmission regime in which a common reference signal is transmitted in every subframe.

Preferably said apparatus comprises a base station.

In another aspect there is provided a computer program comprising computer executable instructions which when run on one or more processors performs the method set out above.

In another aspect there is provided an apparatus comprising at least one processor;

and at least one memory including computer program code; the at least one memory and the computer program code configured to, with the at least one processor, cause the apparatus at least to: determine whether to operate in a first, second or third mode of operation; wherein said first mode of operation comprises a first level of activity, said second mode of operation comprises a second level of activity that is lower than said first level of activity, and said third mode of operation comprises a third level of activity that is lower than said second level of activity; apply a first reference signal transmission regime when in said second mode of operation; and apply a second reference signal transmission regime when in said third mode of operation.

Preferably the apparatus is configured to move from any one of said first, second and third modes of operation to any other of said first, second and third modes of operation.

Preferably said apparatus is configured to operate in said first mode of operation when a parameter satisfies a first threshold level, operate in said second mode of operation when said parameter satisfies a second threshold level that is lower than said first threshold level, and operate in said third mode of operation when said parameter satisfies a third threshold level that is lower than said second threshold level.

Preferably said parameter comprises at least one of: a cell-load, a neighbouring eNB requirement; paging information; user equipment triggering information.

Preferably said first reference signal transmission regime comprises transmitting at least one reference signal with a first time interval.

Preferably said second reference signal transmission regime comprises transmitting at least one reference signal with a second time interval that is longer than said first time interval.

Preferably said first mode of operation is associated with an active state of a base station, said second mode of operation is associated with a short dormancy state of a base station; and said third mode of operation is associated with a long dormancy state of a base station.

Alternatively said second reference signal transmission regime comprises not transmitting any reference signals.

Preferably said at least one reference signal comprises one of: a synchronization signal for a user equipment; a common reference signal; a discovery signal.

Preferably said determining whether to operate in said first, second or third mode of operation is dependent upon a network determination.

Alternatively said determining whether to operate in said first, second or third mode of operation is dependent upon user equipment triggering.

Preferably said apparatus is configured to one or both of: transmit and receive data when in said first mode of operation only.

Preferably said apparatus is configured to de-activate a transmitter and/or receiver of said apparatus when operating in said second mode of operation or said third mode of operation.

Preferably when in said first mode of operation said apparatus is configured to apply a reference signal transmission regime in which a common reference signal is transmitted in every subframe.

Preferably said apparatus comprises a base station.

According to another aspect there is provided an apparatus comprising: means for determining whether to operate in a first, second or third mode of operation;

wherein said first mode of operation comprises a first level of activity, said second mode of operation comprises a second level of activity that is lower than said first level of activity, and said third mode of operation comprises a third level of activity that is lower than said second level of activity; and means for applying a first reference signal transmission regime when in said second mode of operation; and applying a second reference signal transmission regime when in said third mode of operation.

Preferably the apparatus comprises means for moving from any one of said first, second and third modes of operation to any other of said first, second and third modes of operation.

Preferably said apparatus is configured to operate in said first mode of operation when a parameter satisfies a first threshold level, operate in said second mode of operation when said parameter satisfies a second threshold level that is lower than said first threshold level, and operate in said third mode of operation when said parameter satisfies a third threshold level that is lower than said second threshold level.

Preferably said parameter comprises at least one of: a cell-load, a neighbouring eNB requirement; paging information; user equipment triggering information.

Preferably said first reference signal transmission regime comprises transmitting at least one reference signal with a first time interval.

Preferably said second reference signal transmission regime comprises transmitting at least one reference signal with a second time interval that is longer than said first time interval.

Preferably said first mode of operation is associated with an active state of a base station, said second mode of operation is associated with a short dormancy state of a base station; and said third mode of operation is associated with a long dormancy state of a base station.

Alternatively said second reference signal transmission regime comprises not transmitting any reference signals.

Preferably said at least one reference signal comprises one of: a synchronization signal for a user equipment; a common reference signal; a discovery signal.

Preferably said determining whether to operate in said first, second or third mode of operation is dependent upon a network determination.

Alternatively said determining whether to operate in said first, second or third mode of operation is dependent upon user equipment triggering.

Preferably said apparatus is configured to one or both of: transmit and receive data when in said first mode of operation only.

Preferably said apparatus comprises means for de-activating a transmitter and/or receiver of said apparatus when operating in said second mode of operation or said third mode of operation.

Preferably when in said first mode of operation said apparatus is configured to apply a reference signal transmission regime in which a common reference signal is transmitted in every subframe.

Preferably said apparatus comprises a base station.

In another aspect there is provided a method comprising: receiving, at a first apparatus, information regarding a level of activity of a second apparatus; configuring a connection mode of said first apparatus with said second apparatus in dependence on said information, wherein said connection mode comprises a first connection mode or a second connection mode; and said first connection mode comprises a first level of activity, and said second connection mode comprises a second level of activity that is lower than said first level of activity.

Preferably said information comprises information regarding one of: a long dormancy state; a short dormancy state; and an active state of said second apparatus.

Preferably said method comprises configuring said second connection mode when said state of said second apparatus is said long dormancy state, and configuring said first connection mode when said state of said second apparatus is either of said short dormancy state or said active state.

Preferably said first connection mode is a radio resource connection mode and said second connection mode is a radio resource connection idle mode.

Preferably data transmission is prohibited from said first apparatus to said second apparatus when said first apparatus is in said radio resource connection mode and said second apparatus is in said short dormancy state.

Preferably said method comprises moving from any of said first and second connection mode to the other of said first and second connection mode.

Preferably wherein when in said first connection mode said method comprises at least one of transmitting data to and receiving data from said second apparatus.

Preferably said method comprises using said information for synchronization between said first apparatus and said second apparatus.

Preferably said first apparatus comprises a user equipment.

In another aspect there is provided a computer program comprising computer executable instructions which when run on one or more processors perform the method as set out above.

In another aspect there is provided an apparatus comprising at least one processor;

and at least one memory including computer program code; the at least one memory and the computer program code configured to, with the at least one processor, cause the apparatus at least to: receive information regarding a level of activity of a second apparatus; configure a connection mode of said apparatus with said second apparatus in dependence on said information, wherein said connection mode comprises a first connection mode or a second connection mode; and said first connection mode comprises a first level of activity, and said second connection mode comprises a second level of activity that is lower than said first level of activity.

Preferably said information comprises information regarding one of: a long dormancy state; a short dormancy state; and an active state of said second apparatus.

Preferably said apparatus is configured to configure said second connection mode when said state of said second apparatus is said long dormancy state, and configure said first connection mode when said state of said second apparatus is either of said short dormancy state or said active state.

Preferably said first connection mode is a radio resource connection mode and said second connection mode is a radio resource connection idle mode.

Preferably said apparatus is configured to prohibit data transmission to said second apparatus when said apparatus is in said radio resource connection mode and said second apparatus is in said short dormancy state.

Preferably said apparatus is configured to move from any of said first and second connection mode to the other of said first and second connection mode.

Preferably when in said first connection mode said apparatus is configured to at least one of transmit data to and receive data from said second apparatus.

Preferably said apparatus is configured to use said information for synchronization between said apparatus and said second apparatus.

Preferably said apparatus comprises a user equipment.

An apparatus comprising: means for receiving information regarding a level of activity of a second apparatus; means for configuring a connection mode of said apparatus with said second apparatus in dependence on said information, wherein said connection mode comprises a first connection mode or a second connection mode; and said first connection mode comprises a first level of activity, and said second connection mode comprises a second level of activity that is lower than said first level of activity.

Preferably said information comprises information regarding one of: a long dormancy state; a short dormancy state; and an active state of said second apparatus.

Preferably said apparatus comprises means for configuring said second connection mode when said state of said second apparatus is said long dormancy state, and for configuring said first connection mode when said state of said second apparatus is either of said short dormancy state or said active state.

Preferably said first connection mode is a radio resource connection mode and said second connection mode is a radio resource connection idle mode.

Preferably said apparatus comprises means for prohibiting data transmission to said second apparatus when said apparatus is in said radio resource connection mode and said second apparatus is in said short dormancy state.

Preferably said apparatus comprises means for moving from any of said first and second connection mode to the other of said first and second connection mode.

Preferably wherein when in said first connection mode said apparatus comprises means for at least one of transmitting data to and receiving data from said second apparatus.

Preferably said apparatus comprises means for using said information for synchronization between said apparatus and said second apparatus.

Preferably said apparatus comprises a user equipment.

Embodiments will now be described in further detail, by way of example only, with reference to the following examples and accompanying drawings, in which:

FIG. 2 shows a schematic diagram of a mobile communication device according to some embodiments;

FIG. 3 shows a schematic diagram of a control apparatus according to some embodiments;

FIG. 4 shows schematically a number of carrier dormancy options;

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipment (UE) 102, 103, 105 are provided wireless access via at least one base station or similar wireless transmitting and/or receiving node or point. In the FIG. 1 example two overlapping access systems or radio service areas of a cellular system 100 and 110 and three smaller radio service areas 115, 117 and 119 provided by base stations 106, 107, 116, 118 and 120 are shown. Each mobile communication device and station may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Figure 1:
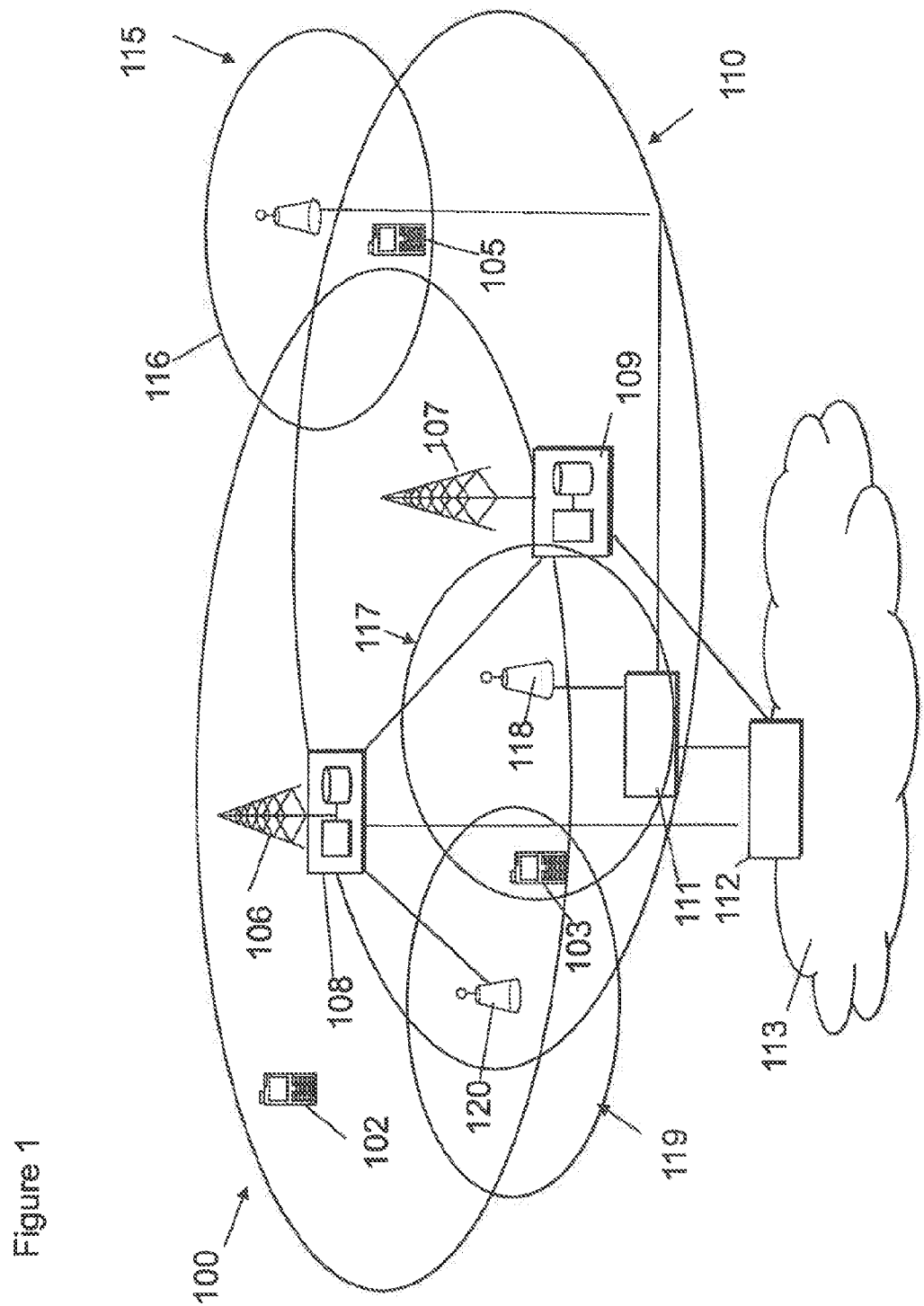
FIG. 1 shows a schematic diagram of a communication system comprising a base station and a plurality of communication devices.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may be considered to have a so-called "flat" architecture, without the provision of RNCs; rather the (e)NB is coupled to a serving gateway (S-GW) and/or mobility management entity (MME), which entities may also be pooled meaning that a plurality of these nodes may serve a plurality (set) of (e)NBs. Each UE is served by only one MME and/or S-GW at a time and the (e)NB keeps track of current association.

In the future some operations or functionalities of an (e)NB may be carried out by cloud services in which case the "base station" may comprise a combination of a remote radio head (RRH) and server or host. Furthermore, according to the "liquid" or flexible radio concept, the operations and functionalities may be performed in different entities, such as a node, host or server, in a flexible manner. In other words, "division of labour" may vary case by case. One possible use is to make a base station deliver local content.

In FIG. 1 stations 106 and 107 are shown as connected to a wider communications network 113 via gateway 112. A further gateway function may be provided to connect to another network.

The smaller stations 116, 118 and 120 can also be connected to the network 113, for example by a separate gateway function and/or via the controllers of the macro level stations. In the example, stations 116 and 118 are connected via a gateway 111 whilst station 120 connects via the controller apparatus 108. In some embodiments, the smaller stations may not be provided. It should be appreciated that the system may also comprise other kind of nodes such as relay nodes or so-called plug-in nodes or home nodes.

A possible mobile communication device will now be described in more detail with reference to FIG. 2 showing a schematic, partially sectioned view of a communication device 102. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone' or multimedia device, a computer provided with a wireless interface card or other wireless interface facility, personal data or digital assistant (PDA), portable media players, digital cameras, pocket video cameras, navigation units (provided with wireless communication capabilities) or any combinations of these or the like. Other suitable devices are control or sensor devices or smart meters for machine-to-machine applications. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 102 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO arrangements as such are known. MIMO systems use multiple antennas at the transmitter and receiver along with advanced digital signal processing to improve link quality and capacity. Although not shown in FIGS. 1 and 2, multiple antennas can be provided, for example at base stations and mobile stations, and the transceiver apparatus 206 of FIG. 2 can provide a plurality of antenna ports. More data can be received and/or sent where there are more antenna elements. A station may comprise an array of multiple antennas. Signalling and muting patterns can be associated with TX antenna numbers or port numbers of MIMO arrangements.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

FIG. 3 shows an example of a control apparatus for a communication system, for example to be coupled to and/or for controlling a station of an access system, such as a base station or node. In some embodiments, base stations comprise a separate control apparatus. In other embodiments, the control apparatus can be another network element such as a radio network controller. In some embodiments, each base station may have such a control apparatus as well as a control apparatus being provided in a radio network controller. The control apparatus 109 can be arranged to provide control on communications in the service area of the system. The control apparatus 109 comprises at least one memory 301, at least one data processing unit 302, 303 and an input/output interface 304. Via the interface the control apparatus can be coupled to a receiver and a transmitter of the base station. The control apparatus 109 can be configured to execute an appropriate software code to provide the control functions.

The communication devices 102, 103, 105 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP LTE specifications are referred to as releases.

More recent developments of the LTE are often referred to as LTE Advanced (LTE-A or LTE-Advanced). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access). In the future, the radio access system may be beyond $4^{th}$ generation (B4G) system, which is designed to be based on a similar kind of architecture as the LTE-Advanced.

As part of 3GPP Release 12 a work item on NCT (new carrier type) has been proposed and agreed. The carrier may be used in such a way in order to achieve one or more of the following aims: network energy-saving; overhead reduction; and enhanced support for arrangements which include one or more smaller cell(s) at least partially overlying a larger cell. Some arrangements where one or more smaller cells overlie a larger cell (for example a macro cell) are sometimes referred to as HetNet arrangements.

To allow for network energy savings, a base station may be controlled to allow for completely blank subframes when there is no data to transmit. This means that the transmitter can be at least partially shut down.

An overhead reduction may be achieved by reducing the CRS (common reference signal) overhead in situations where the DM RS (demodulation reference signal) may be used. The overhead reduction may be particularly advantageous in beam forming MIMO (multiple input multiple output) operation with, for example four or more antennas. In situations such as the HetNet scenario outlined above, there may be reduced interference from common signals.

In LTE release 8/9/10, it has been proposed for one carrier only to allow slow turning on or turning off of the carrier to save energy according to traffic variations. Even if only one user is connected in the network, some signals are still needed to be transmitted to assist the UE in measuring the reference signal received power (RSRP), or to acquire broadcasting information. Regular per-subframe common signal transmission may waste energy.

FIG. 4A schematically shows a carrier 401. This is the new carrier type (NCT) with reduced common reference signal (CRS). As shown the CRS is transmitted periodically, at points 402, 404, 406, 408, 410 and 412.

FIG. 4B shows a backward compatible, fully loaded cell or carrier 414. As shown the fully loaded cell transmits the CRS 416 with a greater frequency than the NCT shown in FIG. 4A. The fully loaded cell 414 also periodically sends a cell identification signal at points 418 and 420. By way of comparison a dormant cell or carrier is shown at 422. The dormant cell transmits a cell identification signal periodically, as shown at 424 and 426. No other signals are sent on the dormant cell. The dormant state has been proposed in LTE release 12 to save energy in the NCT design. During the eNB dormant state the eNB may only transmit the cell identification signal to assist the UE in performing radio resource management (RRM) measurement. The transmission of the cell identification signals may be of relatively long periodicity (longer than on a backwards compatible carrier) to reduce energy consumption and interference generation. In the dormant state the eNB will typically turn off its receiver so as to save further energy.

Some further enhancements have also been proposed to keep good compatibility for the NCT design without introducing a new discovery signal. According to this proposal, the eNB dormant state is characterised by DTX ON and DTX OFF periods. No common signals/channels are transmitted during the eNB DTX OFF period. During the eNB DTX ON period, some primary synchronisation signals (PSS) and secondary synchronisation signals (SSS) and common reference signals (CRS) are transmitted for the purpose of synchronisation and RRM measurements. The eNB DTX ON state appears periodically. If the eNB DTX ON period falls within an eNB active period, then there may not be any additional transmission of the common signals besides those that would be transmitted during the eNB active state in any case.

Figure 5:
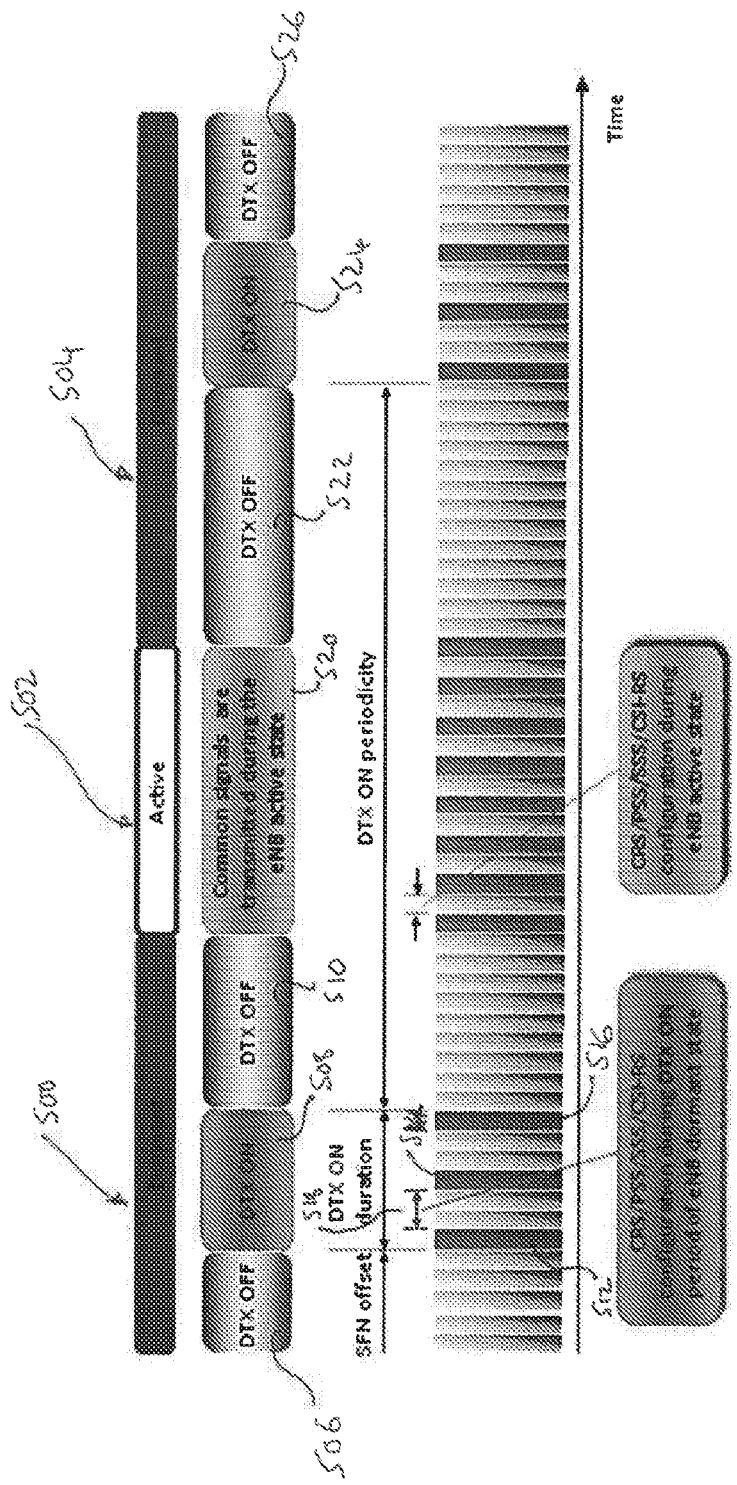
FIG. 5 shows schematically active states and dormant states of a base station.

Reference is made to FIG. 5 which shows schematically the operation of a base station which has dormant and active states. In particular, in the arrangement of FIG. 5, the base station has a first dormant state 500, followed by an active state 502 followed by another dormant state 504. During the first dormant state 500 there is a first DTX OFF period 506 followed by a DTX ON period 508 followed by a second DTX OFF period 510. When the base station is in the DTX OFF period, the base station generally transmits nothing. When the base station is in the DTX ON state, there will be some signals transmitted for example to allow the discovery of neighbouring cells and/or for example to allow the RRM measurements necessary for cell selection. For example during DTX ON period 508 reference signals 512, 514 and 516 are transmitted by the base station. For example during DTX ON period 508, reference signals 512, 514 and 516 are transmitted. CRS/PSS/SSS/CSI-RS configuration occurs in time period 518, which is between the transmission of reference signals 512 and 514.

During the active state 502, the state 520 is such that common signals are transmitted. In other words the base station operates as "normal", transmitting signals to user equipment. In the second dormant state 504, again there is a first DTX OFF state 522 followed by a DTX ON state 524 followed by a DTX OFF state 526. The DTX ON state may last for a relatively large number of subframes and may for example last for more than 10 subframes.

In the proposals of FIG. 4 and FIG. 5 the dormant state is a relatively basic feature. The proposals in FIG. 4 and FIG. 5 do not specify the UE state.

In some embodiments a new working mode of an eNB may be provided.

Some embodiments may provide base stations which support a dual dormant/active state. This may mean DTX (discontinuous transmission) like base station behaviour, with for example relatively long DTX cycles. The UE may perform procedures to take into account the state of the base station. In some embodiments there may be a reduced CRS in the active state.

Some embodiments may allow for base station energy saving, utilising the dormancy operation. Signals may be provided to allow for dormant cell discovery and RRM (radio resource management) measurements.

Some embodiments relate to the use of the eNodeB (eNB) dormancy feature of a carrier for example in the context of small cells. By way of example a small cell may be a pico cell, a HetNet cell or the like.

However, even in the event a cell/carrier is not carrying any traffic, common signals and channels such as one or more of PDCCH (Physical Downlink Control Channel), PHICH (Physical Hybrid ARQ (Automatic Repeat-reQuest) Indicator Channel), PCFICH (Physical Control Format Indicator Channel), PSS/SSS (Primary Synchronization Signal/Secondary Synchronization Signal), PCH (Paging Channel), PBCH (Physical Broadcast Channel), SIB (system information block), CRS (Common (cell specific) Reference Signal) and CSI-RS (Channel State Information Reference Signal) may be required, for example, in order to support mobility. In other words reference signals transmitted by a base station, and received by a user equipment, may comprise any of the above types of signal.

An embodiment provides a base station which is configured to operate at at least three levels of activity: a first level of activity, a second level of activity, and a third level of activity. According to an embodiment the first level of activity is higher than the second level of activity, and the second level of activity is higher than the third level of activity. When a base station is operating at the first level of activity it may be considered to be operating in an "active" state. When the base station is operating at the second level of activity it may be considered to be in a first dormant state. When the base station is operating at the third level of activity it may be considered to be operating in a second dormant state.

Likewise an embodiment provides a user equipment which has at least three connection modes: a first connection mode, a second connection mode, and a third connection mode. These "modes" relate to its connection to a base station. In the first connection mode the user equipment may be considered "active", and operating at a first level of activity. When in the second connection mode the user equipment operates at a second activity level which is lower than the first activity level. When in the third connection mode the user equipment operates at a third activity level that is lower than the second activity level. The connection mode of the user equipment is dependent upon the activity state of the base station.

The first active state of the base station may be considered a state of "normal" operation, in which the base station transmits common reference signals (such as the list of reference signals referred to above) to a user equipment, as well as transmitting data to and receiving data from the user equipment. This may be considered the first activity level. Here the reference signal transmission could be the same as that of existing LTE release 8/9/10.

When the base station is operating in the first dormant state it operates at the second activity level. In this mode the base station will send reference signals to the user equipment, with no further data transmission. The reference signals may be sent less often than when operating at the first activity level, for example with a longer periodicity. Alternatively the base station may transmit data similarly as on a carrier of new carrier type (NCT).

When operating in the second dormant state the base station operates at the third activity level. In the second dormant state the base station may be in a fully dormant state in which no data or reference signals are sent. Alternatively reference signals are transmitted occasionally so as to maintain cell identification to the user equipment. In the third activity level the base station transmits reference signals less frequently than when operating at the second activity level. The reference signals could comprise a common reference signal, synchronization signal or any cell identification signal.

Accordingly the first activity level may be considered a level of activity higher than the second activity level, which in turn is a higher activity level than the third activity level.

Figure 6:
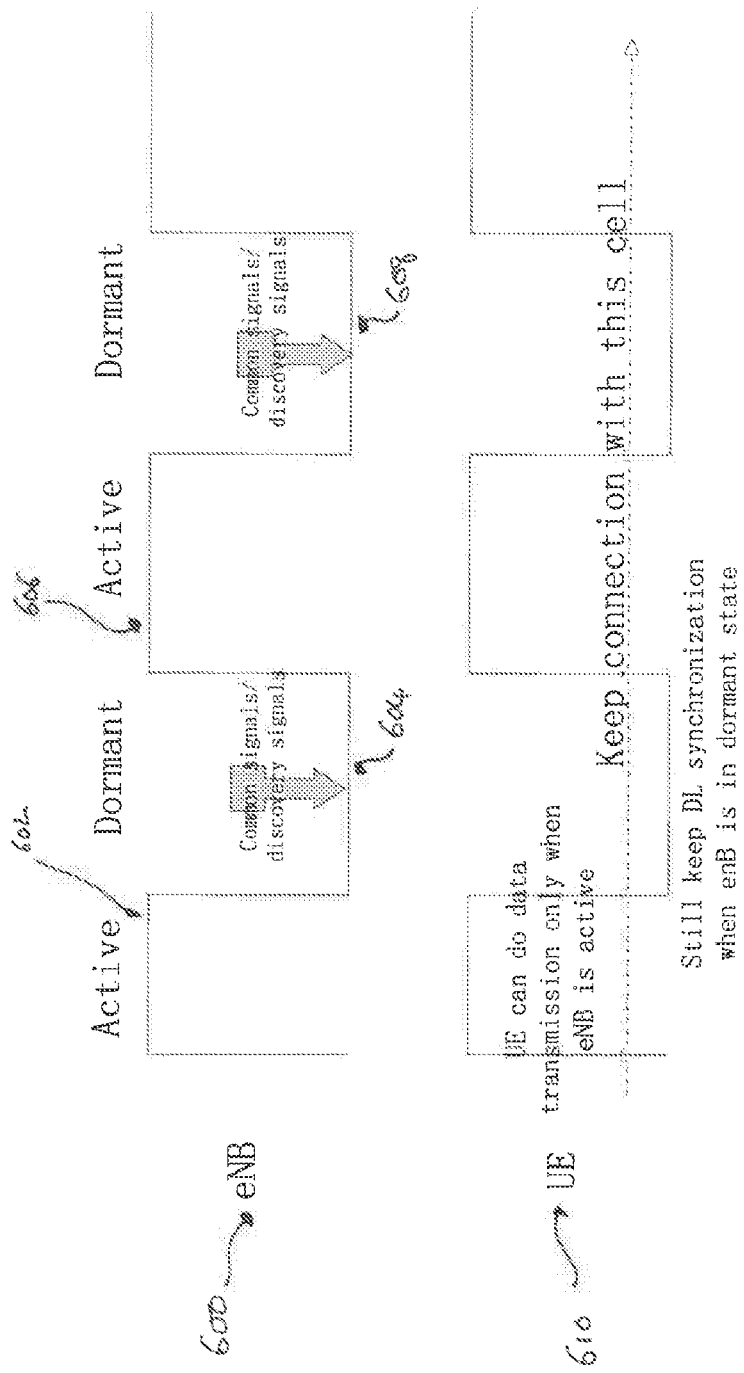
FIG. 6 shows schematically a short dormancy application according to an embodiment.

FIG. 6 illustrates an eNB operating in a "short" dormancy mode i.e. the first dormant state referred to above. FIG. 6 also demonstrates the user equipment behaviour during the short dormancy application. As shown the eNB 600 goes through an active period 602, followed by a dormant period 604, followed by another active period 606, which is followed by another dormant period 608. As shown, the activity level drops significantly during each dormant period. It should be noted that the length of the dormant period can be varied depending on the requirement, and therefore could differ from the dormancy period shown in FIG. 6. In each dormant period the eNB is transmitting common signals/discovery signals, but no further data. These common signals could be for example any one or more of: common reference signals (CRS), primary synchronisation signal (PSS), secondary synchronisation signal (SSS), channel state information reference signal (CSI-RS) etc. The transmission of the common/discovery signals is sufficient to keep the UE alive and in synchronisation with the eNB.

As shown the UE 610 can perform data transmission only when the eNB 600 is in one of its active states 602 or 606. During the dormant state the UE 610 is configured to still receive the common/discovery signals so as to maintain the alive state and to keep DL synchronisation with the eNB, but there is no data transmission by the UE during the dormant period 604 and 608.

The common signals/discovery signals transmitted in the dormant period by the eNB 600 may be transmitted relatively often to allow for UEs to be synchronised during the eNB dormant period. This assumes that the UE 610 is "attached" to the eNB 600 and that it needs to keep DL synchronization between consecutive transmissions of common signals/discovery signals. It will also be appreciated that these common signals/discovery signals may also be transmitted during the "active" period so as to maintain synchronisation during that time. The periodicity of the transmission of the common signals in the dormant period may be different from that of the active period. In one embodiment the signals are transmitted less often in the dormant period than they are in the active period. In another embodiment common/discovery signal requirement can be relaxed, with the common/discovery signals being periodically transmitted to recover DL synchronization.

The UE 610 maintains its connection with the eNB 600 in the carrier/cell whether the eNB 600 is active or dormant. When the cell is a primary cell (P-cell), then this connection may be a radio resource control (RRC) connection, for the purpose of a UE attached in the network. When the cell is a secondary cell (S-cell), then this cell will keep activation for this UE. As previously discussed the UE may be silent for data transmission when the eNB 600 is in the dormant period, but the UE may keep synchronisation with the eNB 600 and perform radio resource management (RRM) measurement. As a special implementation case, if the NB has data transmission in dormant state, UE still could receive the related data signals.

Figure 7:
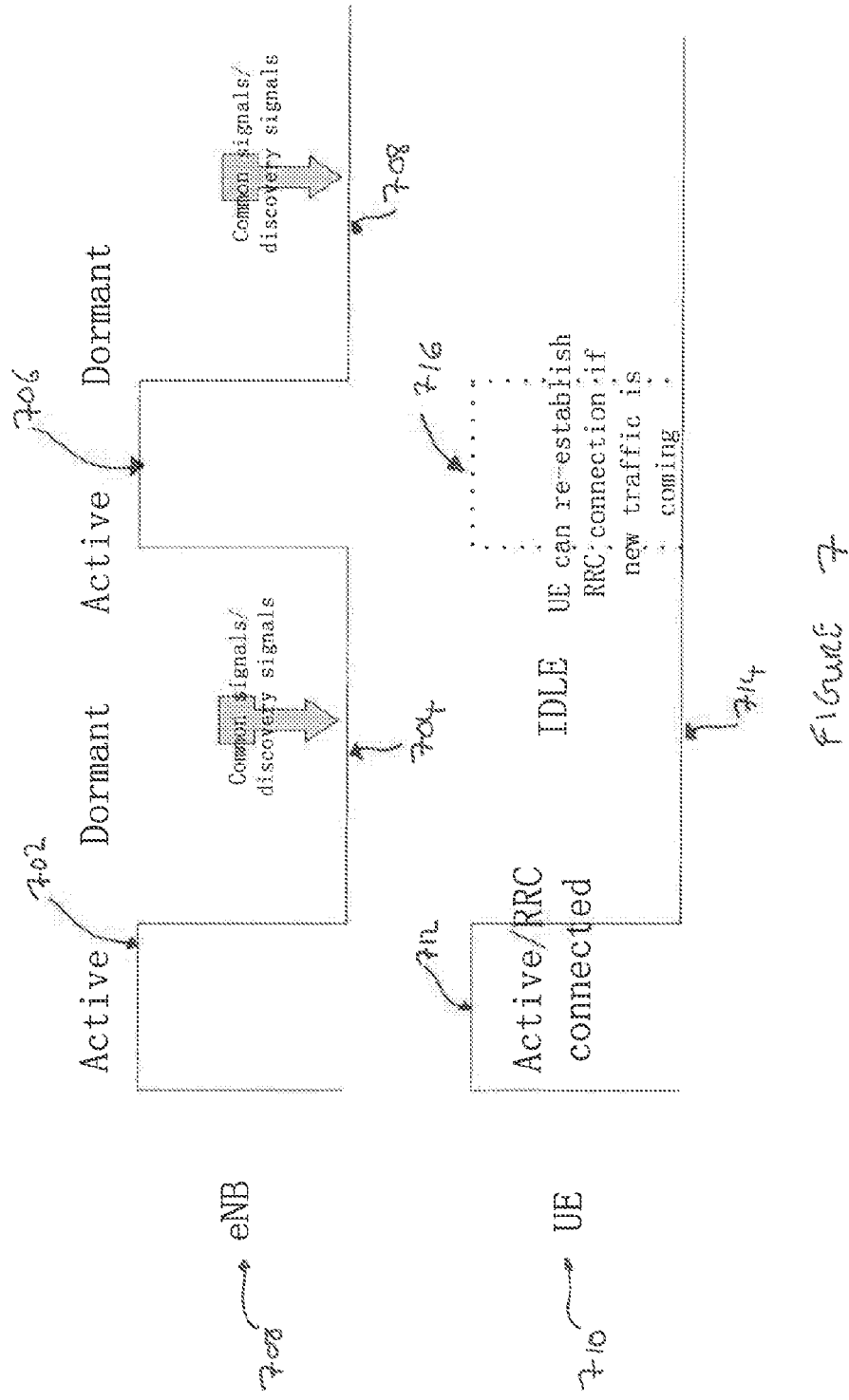
FIG. 7 shows schematically a long dormancy application according to an embodiment.

FIG. 7 illustrates the long dormancy application. In FIG. 7 the eNB 700 has a first active period 702, followed by a dormant period 704, followed by a second active period 706, followed by a second dormant period 708. It will be appreciated that the dormant periods 704 and 708 are longer than the dormant periods 604 and 608 shown in FIG. 6 with respect to the short dormancy application. Similarly to the embodiment of FIG. 6, when in the dormant period the eNB 700 transmits common signals/discovery signals to the UE 710.

As shown at 712 the UE is in an active state when the eNB 700 is also in an active state. When in the active state 712 the UE may be in a RRC connected mode. When the eNB 700 switches from the active mode 702 to the dormant mode 704, the UE 710 moves from the active mode 712 to an idle mode 714. The idle mode 714 may be an RRC idle mode. As shown at 716 when the eNB 700 moves from the dormant state 704 to the active state 706, then the UE 710 can re-establish the RRC connection if new traffic is coming. In the long dormancy application of FIG. 7 the common signals/discovery signals which are transmitted by the eNB in the dormant period may be transmitted less frequently than the common signals/discovery signals are transmitted during the short dormancy application of FIG. 6. Again the common/discovery signals which are transmitted may enable the UE to perform RRM measurement or synchronisation. The synchronization may be rough synchronization. In addition to the periodicity of common signal transmission, another parameter which may be determined is the duration of the common signals e.g. for how long the signals are transmitted when they are transmitted. If the transmission of the common signals is longer than a few ms (e.g. longer than 5 ms) it may also be possible to perform fine synchronization.

As shown in FIG. 7 the UE 710 is capable of moving from the active/RRC connected mode 712 to an idle mode 714. If the connection is a primary cell (P-cell) connection, then the UE may go to the idle state when the eNB 700 is dormant, and is allowed to re-establish the RRC connection (as shown at 716) when the eNB is active if new traffic is ready to be received.

If the connection is a secondary cell connection (S-cell) then this state or carrier could be deactivated when the eNB is dormant.

Thus when the eNB is under a relatively low load the eNB can apply the long dormancy procedure. The UE can stay in the idle mode when the eNB is dormant.

Where there is a higher load (albeit a lower load than when in a fully active data transmission state), the eNB can apply the short dormancy regime. According to this regime the UE can maintain the RRC connection, but may transmit data packets only when in the active state. Interference coordination may also be used between different cells.

It will be appreciated that the examples of FIGS. 6 and 7 are by way of example only and that different active/dormant cycles may be applied. For example each active period may be shorter or longer than those shown. Likewise each dormant period may be shorter or longer than those shown. In other words the dormancy pattern is flexible and maybe configured by the network according to the traffic load.

The cell-load level or threshold at which the eNB and UE switch between their respective modes may be fixed. The threshold levels may be set by the network and then communicated to the eNB. Alternatively the levels can be set by the eNB themselves. These threshold levels can be altered over time. For example the network may communicate new threshold levels to the eNB.

In some embodiments the eNB operates in the first mode of operation when a first threshold level is satisfied, and operates in the second mode of operation when a second threshold level is satisfied that is lower than the first threshold level, and operates in the third mode of operation when a third threshold level is satisfied that is lower than the second threshold level. The threshold level may be associated with a cell-load threshold level, but could also be associated with other parameters. For example such a parameter may be neighbouring eNB requirement. That is the eNB may determine in which mode to operate in dependence on an interference level in a neighbouring cell. That information may be obtained from the neighbouring eNB. Another parameter may be paging information, or UE DL data arrival information from the network. For example an eNB may receive urgent paging calls for the UEs attached to the eNB. The eNB may then take the decision to wake up, for example switching from the second mode to the first mode, or from the third mode to the first mode. Another parameter may be UE triggering information. For example if a UE has UL data packets that need to be sent, the eNB will receive the UE triggering information and then determine its state transition e.g. from the second mode to the first mode, or from the third mode to the first mode.

The above three activity level states can be switched either by eNB determination or UE triggered. The eNB may switch activity state based on cell load or other information, while the UE may trigger eNB state change based on UE's traffic needs.

Figure 8:
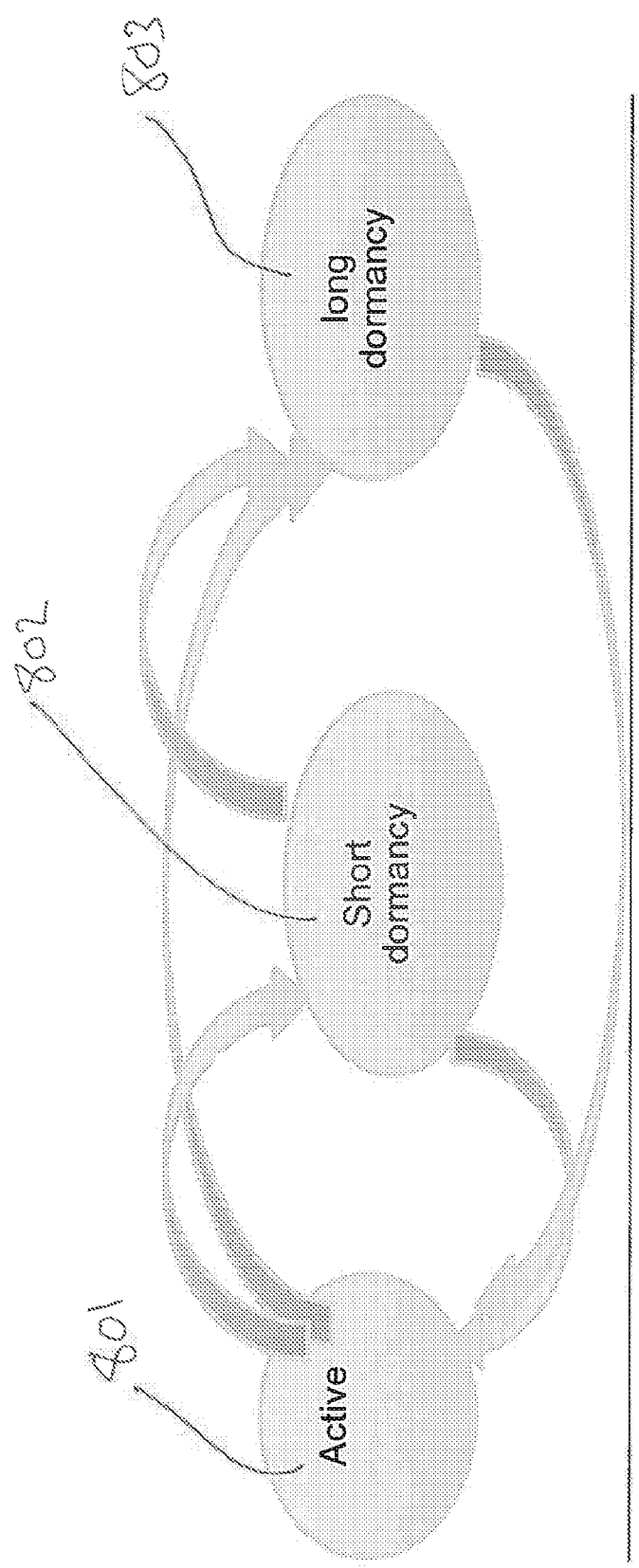
FIG. 8 shows schematically transition between three states of a base station.

It will also be appreciated that the eNB can move between activity levels in any fashion, as shown in FIG. 8. In FIG. 8 the active state is shown at 801, the short dormancy state shown at 802, and the long dormancy state shown at 803. The eNB can move from the active state 801 to the short dormancy state 802. The eNB can also move from the active state 801 directly to the long dormancy state 803. It does not have to first enter the short dormancy state 802. The eNB can move from the short dormancy state 802 to either the active state 801 or the long dormancy state 803. The eNB can move from the long dormancy state 803 to the short dormancy state 802. The eNB can also move directly from the long dormancy state 803 to the active state 801. It does not have to first enter the short dormancy mode 802.

Figure 9:
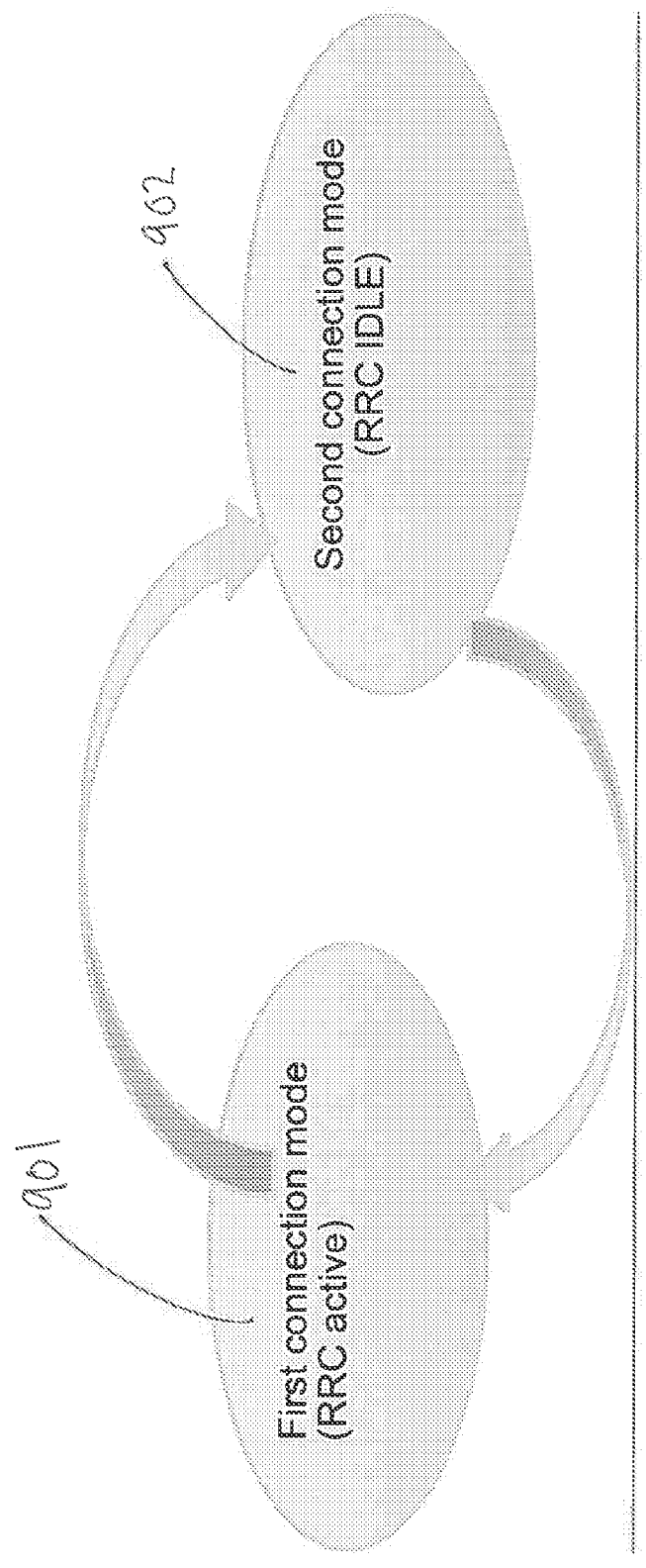
FIG. 9 shows schematically transition between two states of a user equipment.

The UE can move between connection modes in any fashion, as shown in FIG. 9. In FIG. 9 a first connection mode is shown at 901, and a second connection mode is shown at 902. The first connection mode is an RRC connected mode, and the second connection mode is an RRC IDLE mode. The UE can move from the first connection mode 901 to the second connection mode 902. The UE can also move from the second connection mode 902 to the first connection mode 901.

In embodiments the UE connection modes shown in FIG. 9 are mapped to the eNB connection modes shown in FIG. 8. In one embodiment the first UE connection mode 901 (RRC connected) is mapped to two eNB states: the eNB active state 801 and the eNB short dormancy state 802. That is when it is determined that the eNB is in its active state or short dormancy state, the UE will configure itself in the RRC connected mode. In one embodiment when the eNB is in the short dormancy mode the UE may keep silent for data transmission, but keep synchronization with the eNB. When it is determined that the eNB is in the long dormancy mode 803, the UE will configure itself in the second connection mode 902 (RRC IDLE).

The UE may be configured to map itself to the eNB state i.e. the eNB state "leads" and the UE state "follows". In another embodiment the eNB is configured to map itself to the UE state i.e. the UE state "leads" and the eNB state "follows".

It will also be appreciated that the time intervals between transmission of the reference signals can be fixed, and subsequently updated, in a similar way e.g. by communication with the network.

The time interval between the transmission of subsequent reference signals may be periodic. Alternatively the time interval between subsequent reference signals may be non-constant.

It will also be appreciated that FIGS. 6 and 7 show one eNB and one UE. It will of course be appreciated that there may be more than one eNB, and that each eNB may serve one or more UEs.

By tailoring the dormancy cycle to the traffic load conditions then the power consumption of the eNB and one or more UEs can be reduced since they can be put into a dormant or idle mode as necessary.

It will be appreciated that the base stations or eNBs according to the embodiments may comprise the features of a control apparatus as described with respect to FIG. 3. For example in embodiments the eNB may comprise memory means in the form of a memory 301, processing means in the form of processing units 302 and 303, and radio or transceiver means connected to input/output interface 304.

Likewise UE according to embodiments of the present invention may comprise features of a UE discussed with respect to FIG. 2. That is in embodiments UE may comprises memory means in the form of a memory 202, and processing means in the form of a processor 204. The UE may also comprise transceiver means in the form of transceiver 206.

The operations may also be at least partly carried out as a cloud service in which case the apparatus may be located in a server or host or be partly in a server or host and partly in a node. The radio parts may be a remote radio head.

Embodiments may be applied to machine-to-machine communications. User device energy saving and interference control issues are of importance especially in machine-to-machine (M2M) or machine-type communications, such as conveying metering or sensor data to a central processing unit. This data may comprise information on temperature, humidity, energy or water consumption etc. The communications may also comprise control functions, for example for preheating a vehicle or second lodging. This kind of communication is typically of such a nature that it can be delayed for a short period of time and thus dormancy functionality is well-suited for this purpose.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:
1. A method comprising:
determining whether a base station is to operate in a first, second or third mode of operation, wherein said first mode of operation is associated with a long active state of the base station, said second mode of operation is associated with a short active state and a short dormancy state of the base station and said third mode of operation is associated with a long dormancy state of the base station;
wherein said first mode of operation comprises a first level of activity in which data and at least one type of reference signal are sent, said second mode of operation comprises a second level of activity that is lower than said first level of activity in which at least one type of the reference signal is sent, and said third mode of operation comprises a third level of activity that is lower than said second level of activity, wherein said data is included in communication of traffic with a user equipment when in said first mode of operation, the user equipment performs data transmission only when the base station is in the long active state, and said at least one type of reference signal comprises a synchronization signal for the user equipment when in said first mode of operation, including one or more of a primary synchronization signal (PSS) used for synchronization with a primary cell (P-cell) or a secondary synchronization signal (SSS) used for synchronization with a secondary cell (S-cell);

applying a first reference signal transmission regime from the base station to the user equipment during the short dormancy state in which a plurality of said at least one type of reference signal are sent less often than when operating at the first level of activity, with no further data transmission being made, when in said second mode of operation, wherein when the user equipment has synchronized with the P-cell or S-cell that includes the base station and the base station is in the short dormancy state, to maintain a connection of the user equipment with the base station within the P-cell or S-cell, there is no data transmission by the user equipment with the base station, but the user equipment performs one or more measurements of the at least one type of reference signal and reports the one or more measurements; and applying a second reference signal transmission regime in which no data nor reference signals are sent from the base station, when in said third mode of operation.

2. A method as set forth in claim 1, comprising moving from any one of said first, second and third modes of operation to any other of said first, second and third modes of operation.

3. A method as set forth in claim 1, comprising operating in said first mode of operation when a parameter satisfies a first threshold level, operating in said second mode of operation when said parameter satisfies a second threshold level that is lower than said first threshold level, and operating in said third mode of operation when said parameter satisfies a third threshold level that is lower than said second threshold level.

4. A method as set forth in claim 3, wherein said parameter comprises at least one of: a cell-load, a neighbouring eNB requirement; paging information; user equipment triggering information.

5. A method as set forth in claim 1, wherein said first reference signal transmission regime comprises transmitting the at least one reference signal with a first time interval.

6. A method as set forth in claim 5, wherein said second reference signal transmission regime comprises transmitting at least one reference signal with a second time interval that is longer than said first time interval.

7. A base station comprising
at least one processor;
and at least one memory including computer program code;
the at least one memory and the computer program code configured to, with the at least one processor, cause the base station at least to:
determine whether to operate the base station in a first, second or third mode of operation, wherein said first mode of operation is associated with a long active state of the base station, said second mode of operation is associated with a short active state and a short dormancy state of the base station, and said third mode of operation is associated with a long dormancy state of the base station, wherein said first mode of operation comprises a first level of activity in which data and at least one type of reference signal are sent, said second mode of operation comprises a second level of activity that is lower than said first level of activity in which at least one type of the reference signal is sent, and said third mode of operation comprises a third level of activity that is lower than said second level of activity, and wherein said data is included in communication of traffic with a user equipment when in said first mode of operation, the user equipment performs data transmission only when the base station is in the long active state, and said at least one type of reference signal comprises a synchronization signal for the user equipment when in said first mode of operation, including one or more of a primary synchronization signal (PSS) used for synchronization with a primary cell (P-cell) or a secondary synchronization signal (SSS) used for synchronization with a secondary cell (S-cell);

apply a first reference signal transmission regime from the base station to the user equipment during the short dormancy state in which a plurality of said at least one type of reference signal are sent less often than when operating at the first level of activity, with no further data transmission being made, when in said second mode of operation, wherein when the user equipment has synchronized with the P-cell or S-cell that includes the base station, and the base station is in the short dormancy state, to maintain a connection of the user equipment with the base station within the P-cell or S-cell, there is no data transmission by the user equipment with the base station, but the user equipment performs one or more measurements of the at least one type of reference signal and reports the one or more measurements;

and apply a second reference signal transmission regime in which no data nor reference signals are sent from the base station, when in said third mode of operation.

8. A base station as set forth in claim 7, configured to move from any one of said first, second and third modes of operation to any other of said first, second and third modes of operation.

9. A base station as set forth in claim 7, wherein said apparatus is configured to operate in said first mode of operation when a parameter satisfies a first threshold level, operate in said second mode of operation when said parameter satisfies a second threshold level that is lower than said first threshold level, and operate in said third mode of operation when said parameter satisfies a third threshold level that is lower than said second threshold level.

10. A base station as set forth in claim 9, wherein said parameter comprises at least one of: a cell-load, a neighbouring eNB requirement; paging information; user equipment triggering information.

11. A base station as set forth in claim 7, wherein said first reference signal transmission regime comprises transmitting at least one reference signal with a first time interval.

12. A base station as set forth in claim 11, wherein said second reference signal transmission regime comprises transmitting at least one reference signal with a second time interval that is longer than said first time interval.

13. A method comprising:
receiving, at a user equipment, information regarding a level of activity of a base station, wherein said information comprises information regarding one of: a long dormancy state; a short dormancy state; and a long active state of said base station in which data and at least one type of reference signal are sent; and
configuring a radio resource control, RRC mode of said user equipment with said base station in dependence on said information, wherein said RRC mode comprises a first RRC mode being a RRC connected mode or a second RRC mode being a RRC idle mode, wherein said first RRC mode is associated with the long active state of the base station and the short dormancy state of the base station, said second RRC mode is associated with the long dormancy state of the base station, and wherein said data is included in communication of traffic with the user equipment such that the user equipment performs data transmission only when the base station is in the long active state, and said at least one type of reference signal comprises a synchronization signal for the user equipment when the base station is in the long active state, including one or more of a primary synchronization signal (PSS) used for synchronization with a primary cell (P-cell) or a secondary synchronization signal (SSS) used for synchronization with a secondary cell (S-cell);

wherein said first RRC mode comprises a first level of activity and said first RRC mode is configured when said state of said base station is either of said short dormancy state or said long active state, and said second RRC mode comprises a second level of activity that is lower than said first level of activity and said second RRC mode is configured when said state of said base station is said long dormancy state, wherein in said first RRC mode when said state of said base station is said short dormancy state, no further data transmission is received from said base station, wherein in said second RRC mode, no data transmission nor reference signal transmission is received from said base station, and wherein when the user equipment has synchronized with the P-cell or S-cell that includes the base station, and the base station is in the short dormancy state, to maintain a connection of the user equipment with the base station within the P-cell or S-cell, there is no data transmission by the user equipment with the base station, but the user equipment performs one or more measurements of the at least one type of reference signals and reports the one or more measurements.

14. A method as set forth in claim 13, wherein data transmission is prohibited from said user equipment to said base station when said user equipment is in said RRC mode and said base station is in said short dormancy state.

15. A user equipment comprising
at least one processor;
and at least one memory including computer program code;
the at least one memory and the computer program code configured to, with the at least one processor, cause the user equipment at least to:
receive information regarding a level of activity of a base station, wherein said information comprises information regarding one of: a long dormancy state; a short dormancy state; and n long active state of said base station in which data and at least one type of reference signal are sent; and
configure a radio resource control, RRC mode of said user equipment with said base station in dependence on said information, wherein said RRC mode comprises a first RRC mode being a RRC connected mode or a second RRC mode being a RRC idle mode, wherein said first RRC mode is associated with the long active state of the base station and the short dormancy state of the base station, said second RRC mode is associated with the long dormancy state of the base station, and wherein said data is included in communication of traffic with the user equipment such that the user equipment performs data transmission only when the base station is in the long active state, and said at least one type of reference signal comprises a synchronization signal for the user equipment when the base station is in the long active state, including one or more of a primary synchronization signal (PSS) used for synchronization with a primary cell (P-cell) or a secondary synchronization signal (SSS) used for synchronization with a secondary cell (S-cell);

wherein said first RRC mode comprises a first level of activity and said first RRC mode is configured by said user equipment when said state of said base station is either of said short dormancy state or said long active state, and said second RRC mode comprises a second level of activity that is lower than said first level of activity and said second RRC mode is configured by said user equipment when said state of said base station is said long dormancy state, wherein in said first RRC mode when said state of said base station is said short dormancy state, no further data transmission is received from said base station, wherein in said second RRC mode, no data transmission nor reference signal transmission is received from said base station, and wherein when the user equipment has synchronized with the P-cell or S-cell that includes the base station, and the base station is in the short dormancy state, to maintain a connection of the user equipment with the base station within the P-cell or S-cell, there is no data transmission by the user equipment with the base station, but the user equipment performs one or more measurements of the at least one type of reference signals and reports the one or more measurements.

16. A user equipment as set forth in claim 15, wherein said user equipment is configured to prohibit data transmission to said base station when said user equipment is in said RRC mode and said base station is in said short dormancy state.

17. A computer program embodied in a non-transitory computer-readable medium comprising computer executable instructions which, when run on one or more processors, perform the method comprising:
receiving, at a user equipment, information regarding a level of activity of a base station, wherein said information comprises information regarding one of: a long dormancy state; a short dormancy state; and a long active state of said base station in which data and at least one type of reference signal are sent; and
configuring a radio resource control, RRC mode of said user equipment with said base station in dependence on said information, wherein said RRC mode comprises a first RRC mode being a RRC connected mode or a second RRC mode being a RRC idle mode, wherein said first RRC mode is associated with the long active state of the base station and the short dormancy state of the base station, said second RRC mode is associated with the long dormancy state of the base station, and wherein said data is included in communication of traffic with the user equipment such that the user equipment performs data transmission only when the base station is in the long active state, and said at least one type of reference signal comprises a synchronization signal for the user equipment when the base station is in the long active state, including one or more of a primary synchronization signal (PSS) used for synchronization with a primary cell (P-cell) or a secondary synchronization signal (SSS) used for synchronization with a secondary cell (S-cell);

wherein said first RRC comprises mode a first level of activity and said first RRC mode is configured when said state of said base station is either of said short dormancy state or said long active state, and said second RRC mode comprises a second level of activity that is lower than said first level of activity and said second RRC mode is configured by said user equipment when said state of said base station is said long dormancy state, wherein in said first RRC mode when said state of said base station is said short dormancy state, no further data transmission is received from said base station, wherein in said second RRC mode, no data transmission nor reference signal transmission is received from said base station, and wherein when the user equipment has synchronized with the P-cell or S-cell that includes the base station, and the base station is in the short dormancy state, to maintain a connection of the user equipment with the base station within the P-cell or S-cell, there is no data transmission by the user equipment with the base station, but the user equipment performs one or more measurements of the at least one type of reference signals and reports the one or more measurements.

18. The method of claim 17, wherein the determining whether the base station is to operate in the first, the second or the third mode of operation is in response to triggering information received from the user equipment.

* * * * *